US 6,762,993 B1

(12) United States Patent
Kurosawa

(10) Patent No.: US 6,762,993 B1
(45) Date of Patent: Jul. 13, 2004

(54) DCME SYSTEM WITH CIRCUIT SWITCHING CAPABILITY

(75) Inventor: Takuji Kurosawa, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/527,210

(22) Filed: Mar. 16, 2000

(30) Foreign Application Priority Data

Mar. 18, 1999 (JP) ............................................ 11/073898

(51) Int. Cl.[7] ............................................ G01R 31/08
(52) U.S. Cl. ..................... 370/227; 370/242; 370/227; 370/468
(58) Field of Search ............................ 370/241, 242, 370/252, 216, 217, 221, 468, 227; 375/242, 244

(56) References Cited

U.S. PATENT DOCUMENTS 6,320,876 B1 * 11/2001 Virdee et al. ............... 370/468

FOREIGN PATENT DOCUMENTS

JP 6-104859 4/1994

OTHER PUBLICATIONS

ITU, ITU–T G.763, 10/98, ITU, pp. 60–87.*

* cited by examiner

Primary Examiner—Douglas Olms
Assistant Examiner—Robert Wilson
(74) Attorney, Agent, or Firm—Young & Thompson

(57) ABSTRACT

A DCME system having a circuit switching capability for use in a redundant communication system is disclosed. Alarm conditions defined in ITU-T Recommendations G.732 and G.763 are previously stored. When detecting alarm information defined in ITU-T Recommendations G.732 and G.763 from a received signal on each radio circuit, it is determined whether a failure has occurred on each radio circuit by comparing the alarm conditions with the alarm information. One of the radio circuits is selected based on the determination results.

14 Claims, 5 Drawing Sheets

FIG.2

| ALARM | SWITCHING CONDITION |
|---|---|
| (1) LOSS OF INCOMMING SIGNAL AT 2048kbps | 1 |
| (2) LOSS OF FRAME ALIGNMENT | 1 |
| (3) ERROR RATIO $10^3$ ON THE FRAME ALIGNMENT SIGNAL | 1 |
| (4) ALARM INDICATION RECEIVED FROM THE REMOTE END | 1 |
| (5) LOSS OF MULTIFRAME ALIGNMENT | 1 |
| (6) ALARM INDICATION RECEIVED FROM THE REMOTE SIGNALLING MULTIPLEX EQUIPMENT | 1 |
| (7) LOSS OF DCME FRAME ALARM | 1 |
| (8) LOSS OF MULTIFRAME ALIGNMENT | 1 |
| (9) BIT ERROR RATE DETECTED ON THE CONTROL CHANNEL EXCEEDING 1 IN $10^3$ | 0 |
| (10) ALARM INDICATION FROM THE REMOTE END | 1 |

FIG.4

| | PRIMARY ALARM-ON COUNTER | PRIMARY ALARM-OFF COUNTER | SUBSIDIARY ALARM-ON COUNTER | SUBSIDIARY ALARM-OFF COUNTER | CIRCUIT TO BE USED |
|---|---|---|---|---|---|
| (A) | PRESCRIBED VALUE OR LESS | PRESCRIBED VALUE | PRESCRIBED VALUE OR LESS | PRESCRIBED VALUE | PRIMARY |
| (B) | PRESCRIBED VALUE | PRESCRIBED VALUE OR LESS | PRESCRIBED VALUE | PRESCRIBED VALUE | SUBSIDIARY |
| (C) | PRESCRIBED VALUE OR LESS | PRESCRIBED VALUE | PRESCRIBED VALUE | PRESCRIBED VALUE OR LESS | PRIMARY |
| (D) | PRESCRIBED VALUE | PRESCRIBED VALUE OR LESS | PRESCRIBED VALUE | PRESCRIBED VALUE OR LESS | PRIMARY |

DCME SYSTEM WITH CIRCUIT SWITCHING CAPABILITY

BACKGROUND OF THE INVENTION

1. Field of the Invention

The present invention relates to a redundant system including at least one radio circuit, and in particular to a DCME (Digital Circuit Multiplication Equipment) system used for a radio circuit, wherein DCME is defined in ITU-T Recommendation G.763.

2. Description of the Related Art

In general, a communication system using a radio circuit has employed redundant configuration so that, when a failure occurs in a working circuit. it can be switched to another circuit to ensure communication reliability. In satellite communications systems. both circuits of the redundant system are a radio circuit. In terrestrial communications systems, both circuits are a radio circuit in many cases. A wired circuit may be used as the other circuit.

A communication system using DCME is typically formed in conformity with ITU-T Recommendations (G.704, G.732, G.763). The ITU-T G.704 stipulates provisions for frame structure in each bit rate. For example, for a 2048-kbps signal, it is provided to form each frame consisting of 32 time slots (TS). According to the provisions, a synchronization pattern is included in TSO, signaling is assigned to TS 16, and data and speech are assigned to other TSs, a multi-frame consists of 16 frames. and an insertion location of a CRC bit is also stipulated.

Furthermore, in ITU-T Recommendation G. 732, various circuit abnormalities (circuit alarms) including loss of a signal input, loss of a frame synchronizing signal, and a bit error, are stipulated. In ITU-T Recommendation G.763, various alarms (DCME alarms) concerning a DCME unit are stipulated. The DCME unit is defined as a digital circuit multiplexing equipment having both a speech compression function using ADPCM and a DSI (Digital Speech Interpolation) function. Use of these functions is recommended in order to increase the use efficiency of a radio circuit.

As for circuit abnormalities, there is stipulated such a scheme that a station which has detected an alarm issues a switching request to the opposite station, confirms a switching response supplied from the opposite station, and then they execute circuit switching.

In a satellite communication circuit, however, round trip propagation delay time is as long as 0.5 sec. If switching is conducted after waiting a switching response from the opposite station, therefore, rapidity is lost and the system reliability is hampered. Especially when a DCME unit stipulated In ITU-T Recommendation G.763 is used, it is necessary to detect both the circuit alarms stipulated in ITU-T Recommendation G.732 and ITU-T Recommendation G.763. This poses a problem that it takes more and more time to conduct switching.

A conventional circuit switching method in a redundant system has been disclosed In Japanese Patent Unexamined Publication No. 6-104859. According to this conventional method, each of communication devices connected through working and protection transmission lines stores switching condition information, which is used to automatically switch from the working transmission line to the other protection transmission line in case of occurrence of a failure on the working transmission line.

In satellite communications systems, however, a radio communication circuit is frequently in an unstable state hovering between the abnormal state and the normal state. In such an unstable state, the redundant system employing the above conventional switching method is caused to frequently switch between two transmission lines.

SUMMARY OF THE INVENTION

An object of the present invention is to provide a circuit switching method and a DCME system allowing rapid and reliable circuit switching operation.

According to the present invention, a DCME system for use in a redundant communication system having a plurality of circuits including at least one wireless circuit, includes a DCME unit provided for a single wireless circuit, wherein the DCME unit conforms to ITU-T Recommendation G.763 and a storage previously storing alarm conditions defined in ITU-T Recommendations G.732 and G.763. The DCME system further includes an alarm detector for detecting received alarm information from a received signal on each of the plurality of circuits and a determiner for determining whether a failure has occurred on each of the plurality of circuits, by comparing the alarm conditions read from the storage with the received alarm information detected by the alarm detector. A circuit selector selects one of the plurality of circuits depending on a determination result obtained by the determiner.

According to an aspect of the present invention, a DCME system for use in a redundant communication system having first and second radio circuits includes a DCME unit provided for each of the first and second radio circuits, wherein the DCME unit conforms to ITU-T Recommendation G.763 and a storage previously storing alarm conditions defined In ITU-T Recommendations G.732 and G.763. the DCME system further includes a first alarm detector for detecting first alarm information defined in ITU-T Recommendations G.732 and G.763 from a first received signal on the first radio circuit, and a second alarm detector for detecting second alarm information defined in ITU-T Recommendations G.732 and G.763 from a second received signal on the second radio circuit. The DCME system further includes a first determiner for determining whether a failure has occurred on the first radio circuit to produce a first determination result, by comparing the alarm conditions read from the storage with the first alarm information, and a second determiner for determining whether a failure has occurred on the second radio circuit to produce a second determination result, by comparing the alarm conditions read from the storage with the second alarm information. A circuit selector selects one of the first and second radio circuits based on the first and second determination results.

According to the first aspect of the present invention, attention is paid to the fact that the circuit switching can be conducted by using a switching request issued by the opposite station as a trigger. Thus, the DCME system is provided with a circuit switching function capable of determining whether a circuit failure occurs to the extent that switching should be executed, on the basis of the switching request (alarm information) issued by the opposite station and alarm information detected in the own station, and taking an appropriate action. In the own station, therefore, rapid circuit switching can be executed and communication circuit interruption can be prevented.

The first determiner may produce the first determination result which indicates one of a first alarm-on period of time during which a failure has occurred on the first radio circuit within a predetermined time period and a first alarm-off period of time during which a failure has not occurred on the first radio circuit within the predetermined time period. The second determiner may produce the second determination result which indicates one of a second alarm-on period of time during which a failure has occurred on the second radio circuit within the predetermined time period and a second alarm-off period of time during which a failure has not occurred on the second radio circuit within the predetermined time period.

Since the first determination result indicates one of a first alarm-on period of time and a first alarm-off period of time and the second determination result indicates one of a second alarm-on period of time and a second alarm-off period of time, it is possible to determine whether a failure occurs on the first radio circuit and the second radio circuit to the extent that circuit switching is performed from one radio circuit to the other radio circuit before the circuit switching operation. Therefore, the circuit switching can be prevented when the other radio circuit to which a working circuit switches continuously changes in alarm state.

According to a second aspect of the present invention, a DCME system for use in a redundant communication system having a wireless circuit and a wired circuit, includes a DCME unit provided for the wireless circuit, wherein the DCME unit conforms to ITU-T Recommendation G.763; a storage previously storing alarm conditions defined in ITU-T Recommendations G.732 and G.763; a first alarm detector for detecting first alarm information defined in ITU-T Recommendations G.732 and G.763 from a first received signal on the wireless circuit; a second alarm detector for detecting second alarm information defined in ITU-T Recommendations G.732 from a second received signal on the wired circuit; a first determiner for determining whether a failure has occurred on the wireless circuit to produce a first determination result, by comparing the alarm conditions read from the storage with the first alarm information; a second determiner for determining whether a failure has occurred on the wired circuit to produce a second determination result, by comparing the alarm conditions read from the storage with the second alarm information; and a circuit selector for selecting one of the wireless and wired circuits based on the first and second determination results.

According to the second aspect of the present invention, the DCME system for use In such a communication system including a wireless circuit and a wired circuit monitors the circuit states of the wireless circuit on the basis of alarm conditions stipulated in ITU-T G.732 and ITU-T G.763 and the received alarm information stipulated in ITU-T G.732 and ITU-T G.763 and detected from received signals of the wireless circuit, and take an action to switch the operational circuit from the wireless circuit to the wired circuit or maintain the working circuit as it is.

In the own station, therefore, rapid circuit switching can be executed and communication circuit interruption can be prevented in the same way as the first aspect of the present invention.

BRIEF DESCRIPTION OF THE DRAWINGS

FIG. 2 is a diagram showing an example of a switching condition table stored in a ROM;

FIG. 4 is a diagram showing a relationship between each of four counters and a used circuit.

DETAILED DESCRIPTION OF THE PREFERRED EMBODIMENTS

Hereafter, embodiments of the present invention will be described by referring to drawings.

A first embodiment of the present invention is an example of application to such a redundant communication system having a plurality of radio communications circuits (here, a primary circuit and a subsidiary circuit).

Figure 1:
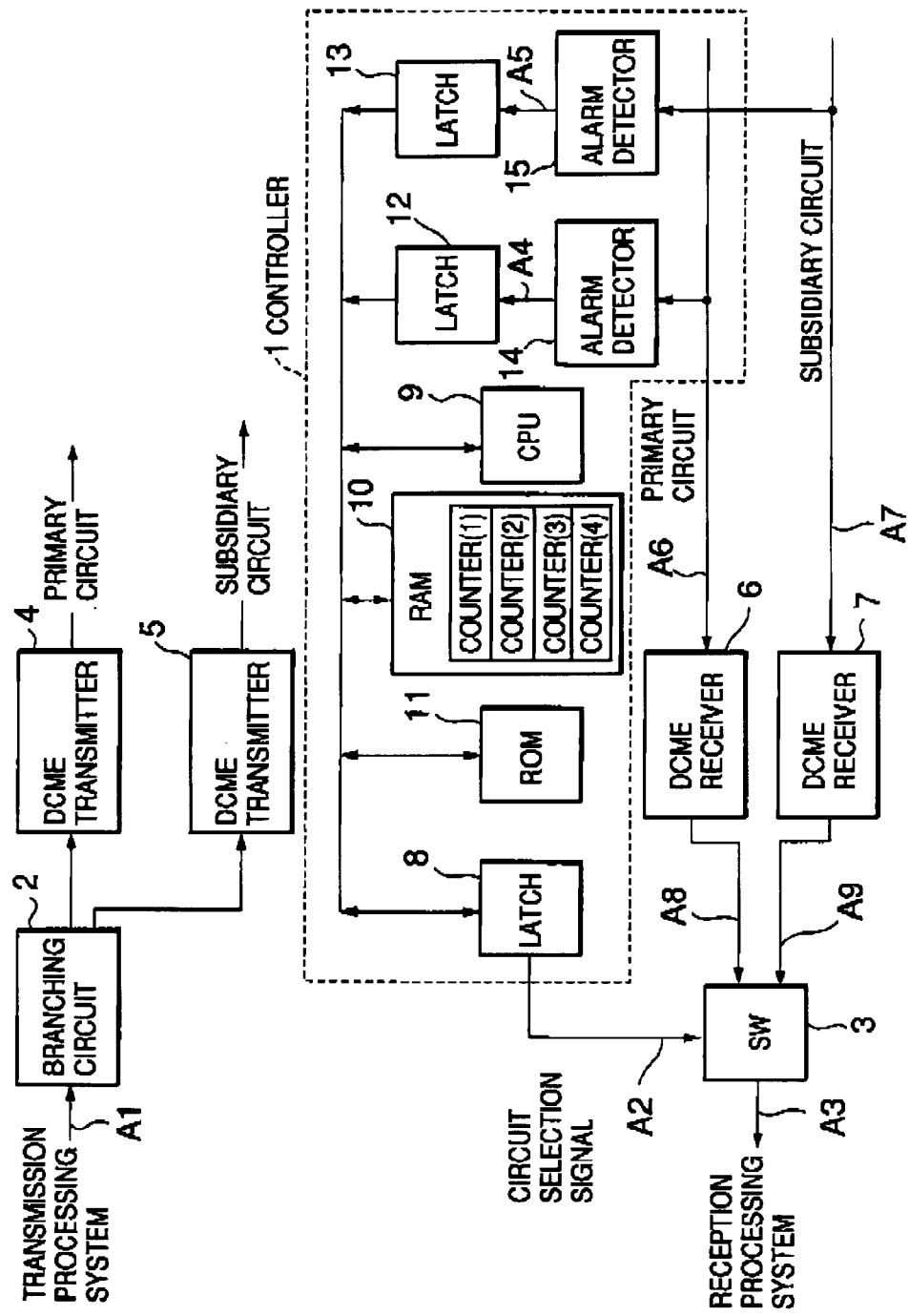
FIG. 1 is a configuration block diagram of a DCME system of a first embodiment according to the present invention.

Referring to FIG. 1, a DCME system according to the first embodiment is obtained by adding a controller 1, a branching circuit 2, and a switch circuit 3 to an ordinary DCME unit consisting of a primary DCME transmitter 4, a subsidiary DCME transmitter 5, a primary DCME receiver 6, and a subsidiary DCME receiver 7.

The DCME transmitters 4 and 5, and DCME receivers 6 and 7 conduct operations conforming to ITU-T Recommendation G.763 on the transmission and reception signals on primary and subsidiary circuits.

The branching circuit 2 connects a transmission signal A1 received from a transmission processing system to inputs of the DCME transmitters 4 and 5. In the illustrated example, an output of the DCME transmitter 4 is connected to a transmission system (not shown) for the primary circuit, whereas an output of the DCME transmitter 5 is connected to a transmission system (not shown) for the subsidiary circuit.

A reception signal A6 from the primary circuit is connected to input of the DCME receiver 6. A reception signal A7 from the subsidiary circuit is connected to an input of the DCME receiver 7. The respective outputs A8 and A9 of the DCME receivers 6 and 7 are connected to the switch circuit 3.

The controller 1 includes a program-controlled processor (here, CPU) 9 for controlling the operations of the DCME system and further includes a RAM (random access memory) 10, a ROM (read-only memory) 11, latch circuits 8, 12 and 13, and alarm detectors 14 and 15, which are connected to the CPU 9 via a bus.

The reception signal A6 from the primary circuit is also connected to an input of the alarm detector 14 in addition to the input of the DCME receiver 6. An output A4 of the alarm detector 14 is connected to an input of the latch circuit 12. The reception signal A7 from the subsidiary circuit is also connected to an input of the alarm detector 15 in addition to the input of the DCME receiver 7. An output A5 of the alarm detector 15 is connected to an input of the latch circuit 13.

An output A2 (circuit selection signal) of the latch circuit 8 is connected to a control terminal of the switch circuit 3. The switch circuit 3 selects one of the outputs A8 and A9 of the DCME receivers 6 and 7 depending on the circuit selection signal A2, and outputs a selected signal A3 to the reception processing system.

In this embodiment, four counters (1)–(4) are provided in the RAM 10. More specifically, the RAM 10 stores two primary counters (primary alarm-off counter and primary alarm-on counter) for primary circuit and two subsidiary counters (subsidiary alarm-off counter and subsidiary alarm-on counter) for subsidiary circuit. Each of the primary and subsidiary alarm-on counters is a counter for measuring the duration of a circuit abnormality state. Each of the alarm-off counters is a counter for measuring a lapse of time after the circuit abnormality state has been canceled.

The ROM 11 stores control programs including a circuit switching control program which implements the circuit switching method according to the first embodiment. The ROM 11 further stores a switching condition table as shown in FIG. 2. The switching condition table is used to determine the switching condition in which the alarms stipulated in ITU-T Recommendations G.732 and G.763 are selectively included in subjects of circuit switching as shown in FIG. 2.

Referring to FIG. 2, the first six alarm items (1) to (6) are stipulated in ITU-T Recommendation G.732, and the alarm items (7) to (10) are stipulated in ITU-T Recommendation G.763. In a column of "switching condition," "1" indicates that the corresponding alarm is included in the switching condition and "0" indicates that the corresponding alarm Is not included in the switching condition. In this example, only the ninth alarm "Bit error rate detected on the Control Channel exceeding 1 in $10^3$ is removed from the switching condition.

An operation of the first embodiment will now be described by referring to FIGS. 3 and 4.

The transmission signal Al from the transmission processing system, as shown in FIG. 1, is inputted to the DCME transmitters 4 and 5 via the branching circuit 2. The output signals of the DCME transmitters 4 and 5 are sent to the primary circuit and the subsidiary circuit through the transmission systems, respectively. The reception signal A6 from the primary circuit is inputted to the DCME receiver 6 and the alarm detector 14. The reception signal A7 from the subsidiary circuit is inputted to the DCME receiver 7 and the alarm detector 15.

Here, the transmission signal Al is a signal of 2048 kbps stipulated in the Recommendation G.732. However, the output signals of the DCME transmitters 4 and 5 are signals of 2048 kbps stipulated in the Recommendation G.763. Therefore, the reception signals A6 and A7 are also signals of 2048 kbps stipulated in the Recommendation G.763. The respective outputs (reception signals) A8 and A9 of the DCME receivers 6 and 7 and the reception signal A3 outputted from the switch circuit 3 to the reception processing system are signals of 2048 kbps stipulated in the Recommendation G. 732.

Figure 3:
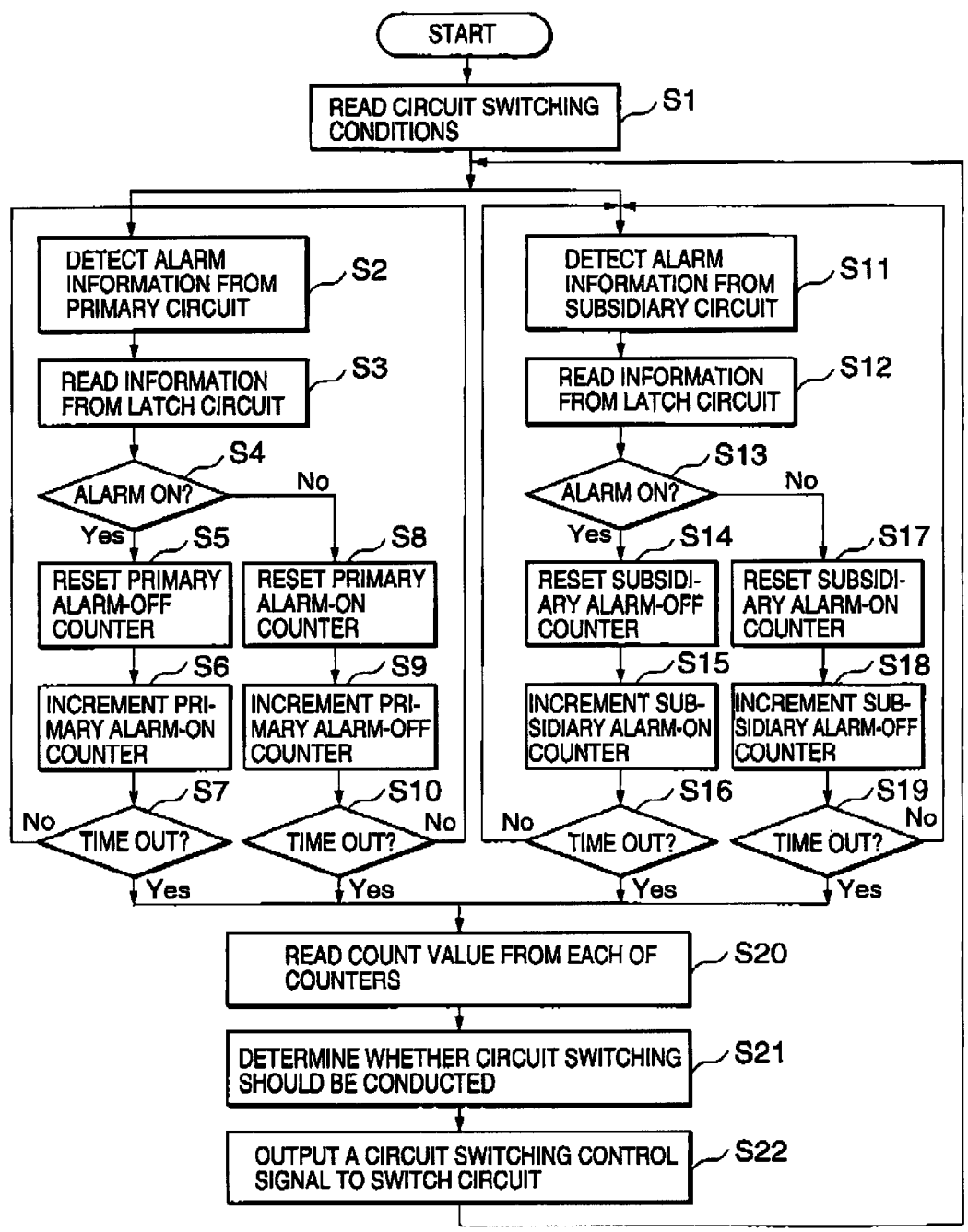
FIG. 3 is a flow chart showing an operation of the first embodiment according to the present invention.

Referring to FIG. 3, when a circuit switching control program is started on the CPU 9, the CPU 9 reads alarm conditions from the switching condition table (see FIG. 2) of the ROM 11 (step S1), and prepares for data collection (steps S2 to S10) concerning the circuit state of the primary circuit and data collection (S11 to S19) concerning the circuit state of the subsidiary circuit. The primary data collection (steps S2 to S10) and the subsidiary data collection (steps S11 to S19) are conducted in parallel.

The alarm detector 14 detects alarm information stipulated in ITU-T Recommendations G. 732 and G.763 from the reception signal A6 on the primary circuit, and outputs the alarm information to the latch circuit 12 (step S2). In the same way, the alarm detector 15 detects alarm information stipulated in ITU-T Recommendations G. 732 and G.763 from the reception signal A7 on the subsidiary circuit, and outputs the alarm information to the latch circuit 13 (step S11). The alarm information detected here includes alarm information received from the opposite station and alarm information newly detected in the own station.

The CPU 9 reads the alarm information concerning the reception signal A6 received from the primary circuit and latched in the latch circuit 12 and the alarm information concerning the reception signal A7 received from the subsidiary circuit and latched in the latch circuit 13 (steps S3 and S12).

Subsequently, the CPU 9 calculates the logical AND of the alarm condition read from the ROM 11 and the alarm information of the primary reception signal A6 read from the latch circuit 12 for each of alarm items. Furthermore, as to all alarm items, the CPU 9 calculates the logical OR of the results of the AND operations to detect the failure state of the primary circuit, and further determines from the failure state whether a failure occurs on the primary circuit to the extent that circuit switching is performed from the primary circuit to the subsidiary circuit (primary alarm ON) (step S4).

Similarly, the CPU 9 calculates the logical AND of the alarm condition read from the ROM 11 and the alarm information of the subsidiary reception signal A7 read from the latch circuit 13 for each of alarm items. Furthermore, as to all alarm items, the CPU 9 calculates the logical OR of the results of the AND operations to detect the failure state of the subsidiary circuit, and further determines from the failure state whether a failure occurs on the subsidiary circuit to the extent that circuit switching is performed from the subsidiary circuit to the primary circuit (subsidiary alarm ON) (step S13).

If such a failure as to need circuit switching has occurred in the primary circuit (YES at the step S4), the CPU 9 resets the primary alarm-off counter (step S5) and increments the primary alarm-on counter by one (step S6). The count value of the primary alarm-on counter represents the duration of the failure that has occurred. Thereafter, unless a predetermined time period has elapsed, the control returns to the step S2.

If the failure as to need circuit switching has not occurred in the primary circuit (NO at the step S4), the CPU 9 resets the primary alarm-on counter (step S8) and increments the primary alarm-off counter by one (step S9). The count value of the primary alarm-off counter represents the duration of the failure cleared state. Thereafter, unless a predetermined time period has elapsed, the control returns to the step S2. In this manner, until the predetermined time period has elapsed, the steps S2 to S10 are repeatedly performed.

If such a failure as to need circuit switching has occurred in the subsidiary circuit (YES at the step S13), the CPU 9 resets the subsidiary alarm-off counter (step S14) and increments the subsidiary alarm-on counter by one (step S15). The count value of the subsidiary alarm-on counter represents the duration of the failure that has occurred. Thereafter, unless a predetermined time period has elapsed, the control returns to the step S11.

If the failure as to need circuit switching has not occurred in the subsidiary circuit (NO at the step S13), the CPU 9 resets the subsidiary alarm-on counter (step S17) and increments the subsidiary alarm-off counter by one (step S18). The count value of the subsidiary alarm-off counter represents the duration of the failure cleared state. Thereafter, unless a predetermined time period has elapsed, the control returns to the step S11. In this manner, until the predetermined time period has elapsed, the steps S11 to S18 are repeatedly performed.

The alarm-on counter and the alarm-off counter for each of the primary circuit and subsidiary circuit, therefore, both measure some period of time when the circuit state is an unstable state hovering between the abnormal state and the normal state. When the circuit state stably stays in either the abnormal state or the normal state, however, one of the alarm-on counter and the alarm-off counter measures the predetermined time period and the other scarcely measures any period of time (see FIG. 4).

Thus the CPU 9 reads the respective count values of the four counters (step S20) and determines whether the circuit switching should be conducted (step S21). Then, the result of the decision is set in the latch circuit 8 (step S22). The data latched in the latch circuit 8 is outputted as the circuit switching control signal A2 to the switch circuit 3.

Hereafter, the operation will be described concretely by referring to FIG. 4. FIG. 4 shows an example of the relation between the count value of each of the four counters operated as described above and the circuit switching operation. In FIG. 4, "prescribed value" is a threshold value of the duration of alarm-ON state (abnormal) and alarm-OFF state (normal). It the duration exceeds the predetermined time period, each counter indicates the "prescribed value" and a time-out occurs.

In the case of (A) of FIG. 4, the content of the primary alarm-on counter is "prescribed value or less" and the content of the primary alarm-off counter is "prescribed value." The content of the subsidiary alarm-on counter is "prescribed value or less" and the content of the subsidiary alarm-off counter is "prescribed value." In this case, both the primary circuit and the subsidiary circuit are normally working. Therefore, the CPU 9 defines the primary circuit as a working circuit, and generates a circuit selection signal A2 for selecting the primary circuit.

In the case of (B), the content of the primary alarm-on counter is "prescribed value" and the content of the primary alarm-off counter is "prescribed value or less." The content of the subsidiary alarm-on counter is "prescribed value or less" and the content of the subsidiary alarm-off counter is "prescribed value." In this case, the primary circuit is in the circuit abnormality state and the subsidiary circuit is normal. Therefore, the CPU 9 defines the subsidiary circuit as the working circuit, and generates the circuit selection signal A2 for selecting the subsidiary circuit.

In the same way, in the case of (C), the primary circuit is normal and the subsidiary circuit is in the circuit abnormality state. Therefore, the CPU 9 judges the switching to be unnecessary and generates the circuit selection signal A2 specifying that the primary circuit should be used as the working circuit.

In the case of (D), both the primary circuit and the subsidiary circuit are in the circuit abnormality state. Therefore, the CPU 9 judges the switching to be impossible, defines the primary circuit as the working circuit continuously, and generates the circuit switching control signal A2 for selecting the primary circuit.

Further, in the case where all counters indicate "prescribed value or less" caused by unstable states of both the primary circuit and the subsidiary circuit, the currently used circuit continues to be used.

In the present embodiment, proper circuit switching control can be conducted in the own station reliably and rapidly as described above. In a communication system having a long propagation delay time such as a satellite circuit, therefore, remarkable advantages are brought about.

A second embodiment according to the present invention will be described hereafter.

The second embodiment is an example of application to a terrestrial communication system. In the second embodiment, a primary circuit is a wireless (radio) circuit and a subsidiary circuit is a wired circuit. An ordinal DCME unit including a DCME transmitter 20 and a DCME receiver 21 conforming to ITU-T Recommendation G.763 is applied to the radio circuit.

Figure 5:
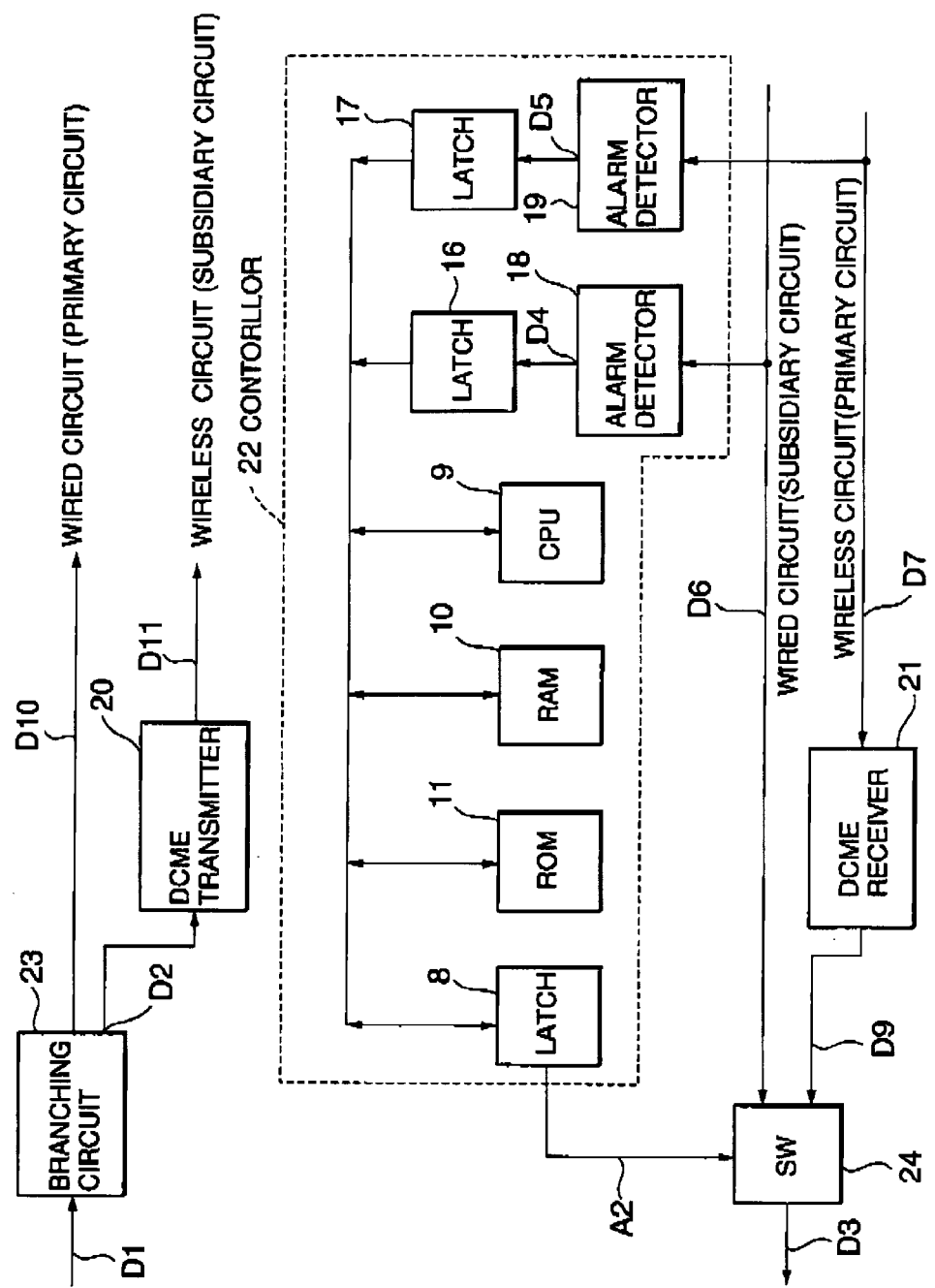
FIG. 5 is a configuration block diagram of a DCME system of a second embodiment according to the present invention.

Referring to FIG. 5, a DCME system according to the second embodiment is obtained by adding a controller 22, a branching circuit 23, and a switch circuit 24 to the ordinal DCME unit in the same way as the first embodiment (see FIG. 1).

The DCME transmitter 20 and the DCME receiver 21 conduct operation stipulated in ITU-T Recommendation G.763 on the transmission and reception signals over the radio circuit (hereafter referred to as "primary circuit").

The branching circuit 23 causes a transmission signal D1 supplied from the transmission processing system to branch into a transmission signal D2 to be outputted to an input of the DCME transmitter 20 and a transmission signal D10 to be sent to the transmission system of the wired circuit (hereafter referred to as "subsidiary circuit"). An output D11 of the DCME transmitter 20 is connected to the transmission system of the primary circuit.

Furthermore, a reception signal D6 from the subsidiary circuit is connected directly to one input terminal of a switch circuit 24. A reception signal D7 from the primary circuit is connected to the DCME receiver 21. An output D3 of DCME receiver 21 is connected to the other input terminal of the switch circuit 24. A selected output D3 of the switch circuit 24 is connected to the reception processing system.

From the viewpoint of components, the controller 22 is the same as the controller 1 of the first embodiment. The controller 22 is different from the controller 1 in that the latch circuits 12 and 13 and the alarm detectors 14 and 15 of the controller 1 are replaced with latch circuits 16 and 17 and alarm detectors 18 and 19, respectively. However, this is not an essential difference. In order to clarify the difference such that the primary circuit is fixed to be a radio circuit and the subsidiary circuit is fixed to be a wired circuit in the second embodiment.

The reception signal D7 from the primary circuit is connected to an input of the alarm detector 19. An output D5 of the alarm detector 19 is connected to an input of the latch circuit 17. Furthermore, the reception signal D6 from the subsidiary circuit is connected to an input of the alarm detector 18. An output D4 of the alarm detector 18 is connected to an input of the latch circuit 16. Other blocks of the configuration are the same as those of the first embodiment. Therefore, the description thereof will be omitted.

An operation of the present second embodiment will now be described. With reference to FIG. 5, the transmission signal D1 inputted from the transmission processing system is branched into the transmission signals D2 and D10. The transmission signal D10 is sent directly to the transmission system of the subsidiary circuit. The transmission signal D2 is outputted to the DCME transmitter 20 and then the output D11 of the DCME transmitter 20 is sent to the transmission system of the primary circuit.

The reception signal D6 from the subsidiary circuit is inputted directly to the switch circuit 24 and to the alarm detector 18. On the other hand, the reception signal D7 from the primary circuit is inputted to the DCME receiver 21 and to the alarm detector 19. The output D9 of the switch circuit 24 is outputted to the switch circuit 24.

Here, the transmission signal D1 is a signal of 2048 kbps stipulated in ITU-T Recommendation G.732. Therefore, the signal sent out to the transmission system of the subsidiary circuit is a signal of 2048 kbps stipulated in ITU-T Recommendation G.732. However, the signal sent out to the transmission system of the primary circuit by the DCME transmitter 20 is a signal of 2048 kbps stipulated in ITU-T Recommendation G.763.

Therefore, the reception signal D6 from the subsidiary circuit is a signal of 2048 kbps stipulated in ITU-T Recommendation G.732, and the reception signal D7 from the primary circuit is a signal of 2048 kbps stipulated in ITU-T Recommendation G.763. Furthermore, the output (reception signal) D9 of the DCME receiver 21 and the reception signal D3 selected by the switch circuit 3 is a signal of 2048 kbps stipulated in ITU-T Recommendation G.732.

The second embodiment differs from the first embodiment only in that the alarm information of the subsidiary circuit is restricted to the alarm information stipulated in ITU-T Recommendation G.732. In the same way as the first embodiment, desired circuit switching control is conducted in accordance with the procedure shown in FIG. 3. Therefore, the same operation and advantages as those of the first embodiment can be obtained.

As described above, the DCME system according to the present invention is provided with a circuit switching function capable of determining whether a circuit failure has occurred to the extent that switching should be executed, on the basis of alarm information issued by the opposite station and alarm information detected in the own station. In the own station, therefore, rapid circuit switching can be executed and communication circuit interruption can be prevented.

Especially if the present invention is applied to a DCME system for use in a satellite circuit, then it is not necessary to consider the delay time and the circuit switching can be executed immediately. As a result, the communication service can be improved.

In the present invention, it is determined whether the circuit switching should be conducted depending on the contents of four counters: primary alarm-on counter; primary alarm-off counter; subsidiary alarm-on counter; and subsidiary alarm-off counter. As a result, stable circuit switching becomes possible.

In the present invention, the DCME system conducts the circuit switching control. In the own station, therefore, the circuit switching can be executed rapidly and the communication service can be improved.

What is claimed is:

1. A DCME (digital circuit multiplication equipment) system for use in a redundant communication system having first and second radio circuits, the DCME system comprising:
   a DCME unit provided for each of the first and second radio circuits;
   a storage previously storing a predetermined set of alarm conditions;
   a first alarm detector for detecting first alarm information from a first received signal on the first radio circuit;
   a second alarm detector for detecting second alarm information from a second received signal on the second radio circuit;
   a first determiner for determining whether a failure has occurred on the first radio circuit to produce a first determination result, by comparing the predetermined set of alarm conditions read from the storage with the first alarm information;
   a second determiner for determining whether a failure has occurred on the second radio circuit to produce a second determination result, by comparing the predetermined set of alarm conditions read from the storage with the second alarm information; and
   a circuit selector for selecting one of the first and second radio circuits based on the first and second determination results.

2. The DCME system according to claim 1, wherein
   the first determiner produces the first determination result which indicates one of a first alarm-on period of time during which a failure has occurred on the first radio circuit within a predetermined time period and a first alarm-off period of time during which a failure has not occurred on the first radio circuit within the predetermined time period; and
   the second determiner produces the second determination result which indicates one of a second alarm-on period of time during which a failure has occurred on the second radio circuit within the predetermined time period and a second alarm-off period of time during which a failure has not occurred on the second radio circuit within the predetermined time period.

3. The DCME system according to claim 2, wherein
   the first determiner comprises:
      a first alarm-on counter for measuring the first alarm-on period of time; and
      a first alarm-off counter for measuring the first alarm-off period of time, and
   the second determiner comprises:
      a second alarm-on counter for measuring the second alarm-on period of time; and
      a second alarm-off counter for measuring the second alarm-off period of time.

4. The DCME system according to claim 2, wherein
   when both of the first alarm-on period of time and the second alarm-on period of time are smaller than a predetermined period of time, the circuit selector selects the first radio circuit;
   when the first alarm-on period of time reaches the predetermined period of time and the second alarm-on period of time is smaller than the predetermined period of time, the circuit selector selects the second radio circuit;
   when the first alarm-on period of time is smaller than the predetermined period of time and the second alarm-on period of time reaches the predetermined period of time, the circuit selector selects the first radio circuit; and
   when both of the first alarm-on period of time and the second alarm-on period of time reach the predetermined period of time, the circuit selector selects the first radio circuit.

5. A DCME (digital circuit multiplication equipment) system for use in a redundant communication system having a wireless circuit and a wired circuit, the DCME system comprising:
   a DCME unit provided for the wireless circuit;
   a storage previously storing a predetermined set of alarm conditions;
   a first alarm detector for detecting first alarm information from a first received signal on the wireless circuit;
   a second alarm detector for detecting second alarm information from a second received signal on the wired circuit;
   a first determiner for determining whether a failure has occurred on the wireless circuit to produce a first determination result, by comparing the predetermined set of alarm conditions read from the storage with the first alarm information;

a second determiner for determining whether a failure has occurred on the wired circuit to produce a second determination result, by comparing the predetermined set of alarm conditions read from the storage with the second alarm information; and a circuit selector for selecting one of the wireless and wired circuits based on the first and second determination results.

6. The DCME system according to claim 5, wherein the first determiner produces the first determination result which indicates one of a first alarm-on period of time during which a failure has occurred on the wireless circuit within a predetermined time period and a first alarm-off period of time during which a failure has not occurred on the wireless circuit within the predetermined time period; and the second determiner produces the second determination result which indicates one of a second alarm-on period of time during which a failure has occurred on the wired circuit within the predetermined time period and a second alarm-off period of time during which a failure has not occurred on the wired circuit within the predetermined time period.

7. The DCME system according to claim 6, wherein the first determiner comprises:
 a first alarm-on counter for measuring the first alarm-on period of time; and
 a first alarm-off counter for measuring the first alarm-off period of time, and the second determiner comprises:
 a second alarm-on counter for measuring the second alarm-on period of time; and
 a second alarm-off counter for measuring the second alarm-off period of time.

8. The DCME system according to claim 6, wherein when both of the first alarm-on period of time and the second alarm-on period of time are smaller than a predetermined period of time, the circuit selector selects the wireless circuit;

when the first alarm-on period of time reaches the predetermined period of time and the second alarm-on period of time is smaller than the predetermined period of time, the circuit selector selects the wired circuit;

when the first alarm-on period of time is smaller than the predetermined period of time and the second alarm-on period of time reaches the predetermined period of time, the circuit selector selects the wireless circuit; and when both of the first alarm-on period of time and the second alarm-on period of time reach the predetermined period of time, the circuit selector selects the wireless circuit.

9. A circuit switching method in a DCME (digital circuit multiplication equipment) system for use in a redundant communication system having first and second radio circuits, wherein a DCME unit provided for each of the first and second radio circuits, comprising the steps of:

storing a predetermined set of alarm conditions;

detecting first alarm information from a first received signal on the first radio circuit;

detecting second alarm information from a second received signal on the second radio circuit;

determining whether a failure has occurred on the first radio circuit to produce a first determination result, by comparing the predetermined set of alarm conditions read from the storage with the first alarm information;

determining whether a failure has occurred on the second radio circuit to produce a second determination result, by comparing the predetermined set of alarm conditions read from the storage with the second alarm information; and selecting one of the first and second radio circuits based on the first and second determination results.

10. The circuit switching method according to claim 9, wherein the first determination result indicates one of a first alarm-on period of time during which a failure has occurred on the first radio circuit within a predetermined time period and a first alarm-off period of time during which a failure has not occurred on the first radio circuit within the predetermined time period; and the second determination result indicates one of a second alarm-on period of time during which a failure has occurred on the second radio circuit within the predetermined time period and a second alarm-off period of time during which a failure has not occurred on the second radio circuit within the predetermined time period.

11. The circuit switching method according to claim 10, wherein when both of the first alarm-on period of time and the second alarm-on period of time are smaller than a predetermined period of time, the first radio circuit is selected;

when the first alarm-on period of time reaches the predetermined period of time and the second alarm-on period of time is smaller than the predetermined period of time, the second radio circuit is selected;

when the first alarm-on period of time is smaller than the predetermined period of time and the second alarm-on period of time, reaches the predetermined period of time, the first radio circuit is selected; and when both of the first alarm-on period of time and the second alarm-on period of time reach the predetermined period of time, the first radio circuit is selected.

12. A circuit switching method in a DCME (digital circuit multiplication equipment) system for use in a redundant communication system having wireless and wired circuits, wherein a DCME unit provided for each of the wireless and wired circuits, comprising the steps of:

storing a predetermined set of alarm conditions;

detecting first alarm information from a first received signal on the wireless circuit;

detecting second alarm information from a second received signal on the wired circuit;

determining whether a failure has occurred on the wireless circuit to produce a first determination result, by comparing the predetermined set of alarm conditions read from the storage with the first alarm information;

determining whether a failure has occurred on the wired circuit to produce a second determination result, by comparing the predetermined set of alarm conditions read from the storage with the second alarm information; and selecting one of the wireless and wired circuits based on the first and second determination results.

13. The circuit switching method according to claim 12, wherein the first determination result indicates one of a first alarm-on period of time during which a failure has occurred on the wireless circuit within a predetermined time period and a first alarm-off period of time during which a failure has not occurred on the wireless circuit within the predetermined time period; and the second determination result indicates one of a second alarm-on period of time during which a failure has occurred on the wired circuit within the predetermined time period and a second alarm-off period of time during which a failure has not occurred on the wired circuit within the predetermined time period.

14. The circuit switching method according to claim 12, wherein when both of the first alarm-on period of time and the second alarm-on period of time are smaller than a predetermined period of time, the wireless circuit is selected;

when the first alarm-on period of time reaches the predetermined period of time and the second alarm-on period of time is smaller than the predetermined period of time, the wired circuit is selected;

when the first alarm-on period of time is smaller than the predetermined period of time and the second alarm-on period of time reaches the predetermined period of time, the wireless circuit is selected; and when both of the first alarm-on period of time and the second alarm-on period of time reach the predetermined period of time, the wireless circuit is selected.

* * * * *